UNITED STATES PATENT OFFICE.

NILS ALEXANDER ALEXANDERSON, OF STOCKHOLM, SWEDEN.

METHOD OF RENDERING CLOTH, WOOD, PAPER, &c., WATER-PROOF.

SPECIFICATION forming part of Letters Patent No. 326,088, dated September 15, 1885.

Application filed September 22, 1884. (No specimens.)

*To all whom it may concern:*

Be it known that I, NILS ALEXANDER ALEXANDERSON, a subject of the King of Sweden and Norway, and a resident of Stockholm, Kingdom of Sweden, have invented an Improved Method of Rendering Cloth, Wood, Paper, &c., Water-Proof, but not air-tight, of which the following is a specification.

To prepare cloth which will not get moistened by water, and yet which will not prevent the free passage of the air, has long been the aim of many an enterprising manufacturer. Among the attempts made in this direction, those which have been founded on precipitation of soap of aluminium (alumina combined with some fat acid) on the fibers of the cloth have led to the best results.

Having for a long period of time studied the qualities of salts of aluminium and their connection to fibers, I have succeeded in a manner which for cheapness and simplicity is, in my belief, incomparably superior to all hitherto tried methods, and I do this without the use of fat acids, soaps, &c., to prepare the cloth. At the same time my invention permits the air free passage through the cloth and renders it to the highest degree waterproof and unattackable by moths and mold.

Instead of the hitherto used neutral (or almost neutral) salts, I make salts strongly basic by putting to the neutral salt an equivalent quantity of the carbonates or hydrates of the alkalies and of the alkaline earths. The reaction takes place as follows:

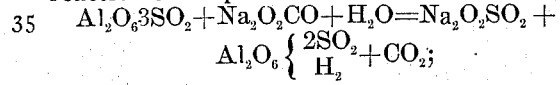

or

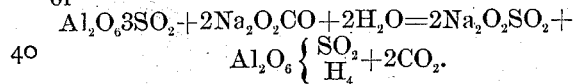

A solution of such a basic salt has the quality that the salt at dilution with a sufficient quantity of water divides itself into one salt more neutral and dissoluble in water and into a salt still more basic and which is indissoluble in water. If a cloth impregnated by such a solution be afterward immediately rinsed, this chemical reaction takes place, at which the indissoluble salt *in statu nascenti*—that is, in its natural state—fastens to the fibers of the cloth, and the indissoluble salt is rinsed off by the water.

To prevent the indissoluble salt from precipitating too soon, I put to the solution tartaric acid, citric acid, or any other of such organic matters which promote the solubility of salts of aluminium.

On these grounds I have founded my method, which is carried on as follows: To a solution of a salt of aluminium (I generally use a solution of, say, twenty per cent.)—for instance, of sulphate of alumina—I put so much of a solution of soda that on one hundred parts of sulphate of alumina come forty-five to sixty parts of soda. To this I put tartaric acid or citric acid to a quantity which depends upon the strength of the solution, and which in its order is dependent on the different qualities of the cloths, because vegetable and animal fibers show themselves very differently at the impregnation, and therefore require different strengths of the solution. The cloth is impregnated with this solution, and then immediately very carefully rinsed with pure water until the last trace of soluble salt has been rinsed away from the cloth. Finally, it must be quickly dried by means of passing it over rollers heated to a high temperature by steam.

Having now particularly described and ascertained the nature of my said invention, and in what manner the same is to be practiced, I declare that what I claim is—

The described method of waterproofing cloths and other textile materials, consisting in impregnating the same with a solution of some basic salt of aluminium prepared by putting an equivalent quantity of the hydrates or carbonates of the alkalies or of the alkaline earths to a neutral salt of aluminium; next, if needed, mixing the same with tartaric or citric acid, and then carefully rinsing the cloth, and, finally, subjecting it to a quick drying, all substantially as above set forth.

In testimony whereof I have signed my name to this specification in the presence of two subscribing witnesses.

NILS ALEXANDER ALEXANDERSON.

Witnesses:
 JOHN EDBERG,
 OSKAR ANNETT.